No. 843,913. PATENTED FEB. 12, 1907.
J. S. STEVENSON.
VEHICLE WHEEL.
APPLICATION FILED MAR. 5, 1906.

WITNESSES
INVENTOR
JOHN S. STEVENSON
BY
ATT'YS.

UNITED STATES PATENT OFFICE.

JOHN S. STEVENSON, OF DETROIT, MICHIGAN.

VEHICLE-WHEEL.

No. 843,913.  Specification of Letters Patent.  Patented Feb. 12, 1907.

Application filed March 5, 1906. Serial No. 304,367.

*To all whom it may concern:*

Be it known that I, JOHN S. STEVENSON, a citizen of the United States of America, residing at Detroit, in the county of Wayne and State of Michigan, have invented certain new and useful Improvements in Vehicle-Wheels, of which the following is a specification, reference being had therein to the accompanying drawings.

My invention relates to new and useful improvements in vehicle-wheels, and particularly to hubs therefor, and consists in a novel construction and arrangement of parts whereby a pneumatic or other resilient member is provided in the wheel-hub.

The object of my invention is to remove the resilient portion of the wheel from the tire where it is subjected to serious strain and wear and to place it in the hub where it will be protected and where the only strains and wear to which it is subjected will be those resulting from jars and unevenness in the pavement over which the vehicle is running. The means by which I have attained this object will be more fully hereinafter described, and set forth in the claims.

Figure 1:
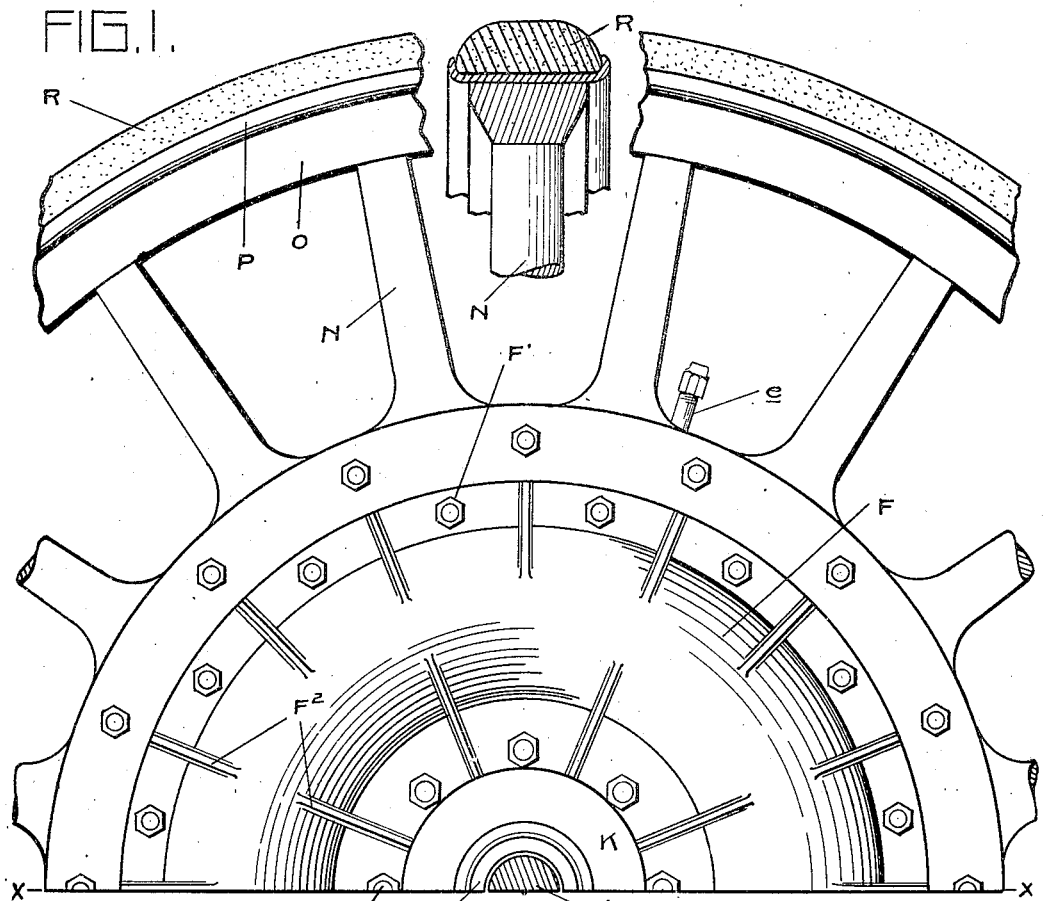
Figure 2:
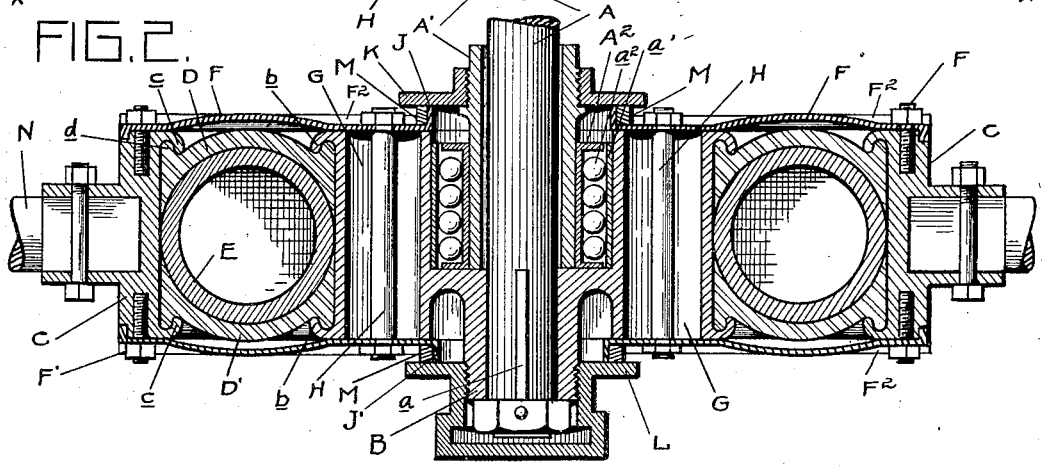

In the drawings, Figure 1 is an elevation of my improved hub with portions broken away, and Fig. 2 is a cross-section on lines $xx$ of Fig. 1.

A is the shaft or axle, on which is secured the central or inner hub B by means of a key $a$. A' is the axle-sleeve or housing, and $A^2$ is a ball-race for balls $a^2$, acting on the bearing $a'$ on the inside of the hub B. The axle or shaft may be secured to the hub in any suitable manner, and the bearing may be constructed in any of the ways well known to those skilled in the art without departing from the scope of my invention, so I will not further describe them.

C is the outer or annular hub and is spaced from the hub B, and the inside of hub C and the outside of hub B are provided at their edges with the annular lugs or flanges $cc$ and $bb$, respectively. These lugs or flanges are curved or hook-shaped in cross-section to engage the flanges $d$ on the complementary annular members D D'. These members are preferably formed of heavy rubber or other suitable material, and their web portions—to wit, the portions extending between the hubs—are preferably segmental in cross-section while the portions abutting the hubs are straight in cross-section. Between these members D D' is a pneumatic tube E, preferably annular, and when inflated completely filling the space between the members, and thus locking said members in position. Inflation is provided for at the nipple $e$.

On opposite sides of the hub C are annular plates F, slightly curved in cross-section and radially ribbed at $F^2$, secured thereto by bolts or lag-screws F' and forming flanges bridging the space between the hubs and overlapping the hub B. G G are parallel apertures at radially-located points in the hub B, and H H are bolts connecting the plates F and passing loosely through said apertures. The inner edges of the plates F are preferably struck up to form flanges J J', and the edges of these plates contact, respectively, with a flange K on the axle-sleeve and the flange L on the hub B. I have shown the flange L as screw-threaded on the hub B and forming a cap for the end of the axle, but this is not essential. Outside of the flanges J J', I place suitable packing-rings M, and thus exclude dust and dirt from the bearings and the inner hub and resilient member. On the outside of the hub C are the spokes N, the felly O, the rim P, and a suitable tire R. As the construction of these elements is not essential, I shall not further describe them.

From the above description it will be seen that all strains or jars to which either hub is subjected must be transmitted to the other hub through the medium of the resilient member. The flange-plates F take up all side thrusts, and each hub can move independently a distance equal to the radius of the apertures G.

What I claim as my invention is—

1. In a hub for vehicle-wheels the combination with a central member, of an annular member therearound, complementary members between and secured to said central and annular members and a resilient member between said complementary members, for the purpose described.

2. In a vehicle-wheel the combination with a central hub, of an annular hub therearound, complementary yielding members between said hubs and an annular resilient tube between complementary members, for the purpose described.

3. In a vehicle-wheel the combination with a central hub having radially-located parallel apertures therein, of an annular hub around said central hub and spaced therefrom, annular flanges on opposite sides of said annular hub and overlapping said central hub, members passing loosely through said apertures and connecting said flanges and a resilient member between said hubs, for the purpose described.

4. In a vehicle-wheel the combination with a central hub having radially-located parallel apertures therein, of an annular hub around and spaced from said central hub, annular plates secured on opposite sides of said annular hub, forming flanges overlapping said central hub, members connecting said flanges and passing loosely through said apertures and a resilent member between said hubs, for the purpose described.

5. In a vehicle-wheel the combination with an inner and an outer hub, of a yielding member between and secured to said hubs and flanges on opposite sides of one of said hubs and overlapping the other, for the purpose described.

6. In a vehicle-wheel the combination with an inner and an outer hub, of a yielding member between said hubs, flanges on opposite sides of one of said hubs and overlapping the other hub and bolts connecting said flanges and passing loosely through apertures in said last-mentioned hub.

7. In a vehicle-wheel the combination with an inner and an outer hub, of complementary yielding members between and secured to said hubs and a resilient member between and supporting said yielding members, for the purpose described.

8. In a vehicle-wheel the combination with an inner and an outer hub, of a yielding member between said hubs, a flange on said outer hub overlapping said inner hub, a flange on said inner hub contacting with said first-mentioned flange and a packing-ring associated therewith, for the purpose described.

In testimony whereof I affix my signature in presence of two witnesses.

JOHN S. STEVENSON.

Witnesses:
 JAMES WHITTEMORE,
 AMELIA WILLIAMS.